(12) United States Patent
Wang et al.

(10) Patent No.: US 10,354,770 B2
(45) Date of Patent: Jul. 16, 2019

(54) RESIDUAL HEAT REMOVAL VENTILATION SYSTEM FOR SPENT FUEL DRY STORAGE FACILITY OF NUCLEAR POWER PLANT

(71) Applicant: Tsinghua University, Beijing (CN)

(72) Inventors: Jinhua Wang, Beijing (CN); Zuoyi Zhang, Beijing (CN); Yue Li, Beijing (CN); Bin Wu, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 15/741,908

(22) PCT Filed: Dec. 31, 2015

(86) PCT No.: PCT/CN2015/100271
§ 371 (c)(1),
(2) Date: Jan. 4, 2018

(87) PCT Pub. No.: WO2017/113362
PCT Pub. Date: Jul. 6, 2017

(65) Prior Publication Data
US 2018/0301234 A1    Oct. 18, 2018

(51) Int. Cl.
*G21F 5/10* (2006.01)
*G21D 1/02* (2006.01)
*G21C 19/40* (2006.01)

(52) U.S. Cl.
CPC .......... *G21F 5/10* (2013.01); *G21C 19/40* (2013.01); *G21D 1/02* (2013.01); *Y02E 30/40* (2013.01)

(58) Field of Classification Search
CPC ............. G21F 5/10; G21C 19/40; G21D 1/02
See application file for complete search history.

(56) References Cited

U.S. PATENT DOCUMENTS

| | | | | |
|---|---|---|---|---|
| 5,043,136 A | * | 8/1991 | Hunsbedt | G21C 15/18 376/299 |
| 5,469,480 A | * | 11/1995 | Park | G21C 15/182 376/299 |
| 2015/0357066 A1 | * | 12/2015 | Singh | G21F 5/14 405/129.55 |

FOREIGN PATENT DOCUMENTS

| | | | |
|---|---|---|---|
| CN | 101740147 | | 6/2010 |
| CN | 101740147 A | * | 6/2010 |
| CN | 201540743 | | 8/2010 |

(Continued)

*Primary Examiner* — Lily C Garner
(74) *Attorney, Agent, or Firm* — IP & T Group LLP

(57) ABSTRACT

A residual heat removal ventilation system for spent fuel dry storage facility of nuclear power plant includes a natural ventilation apparatus and a forced ventilation apparatus, comprising a cold air intake chamber, a hot air removal chamber, a pipeline, a ventilation heat shield cylinder, a heat removal fan, and an air cooling equipment having certain connecting relationships and being correspondingly arranged in a storeroom, an operating room and a ventilation equipment room. The system doesn't require storing spent fuel in a pool storage manner. The safety of the spent fuel doesn't rely on power equipment, thus not only reducing routine maintenance, saving energy, but also has inherent safety. Furthermore, the system can be used to cool spent fuel storage canisters within spent fuel storage facility of pebble bed high temperature gas-cooled reactor nuclear power plant, and discharge residual heat of spent fuel storage canisters to the external environment.

10 Claims, 4 Drawing Sheets

(56) References Cited

FOREIGN PATENT DOCUMENTS

| | | | |
|---|---|---|---|
| CN | 201540743 U | * | 8/2010 |
| CN | 102693769 | | 9/2012 |
| CN | 102693769 A | * | 9/2012 |
| EP | 0 462 810 | | 12/1991 |

* cited by examiner

US 10,354,770 B2

RESIDUAL HEAT REMOVAL VENTILATION SYSTEM FOR SPENT FUEL DRY STORAGE FACILITY OF NUCLEAR POWER PLANT

This application is a national stage application of PCT/CN2015/100271 filed on Dec. 31, 2015. The disclosure of each of the foregoing applications is incorporated herein by reference in its entirety.

TECHNICAL FIELD

The present disclosure relates to the technical field of reactor engineering, and particularly, to a residual heat removal ventilation system for spent fuel dry storage facility of nuclear power plant.

BACKGROUND

Since the appearance of nuclear power plants, various technologies have continuously developed and become one of the indispensable energy of the major countries in the world. The key equipment of nuclear power plant is the reactor, which has developed several types, including pressurized water reactors, boiling water reactors and gas-cooled reactors. Spent fuel produced by the reactor operation has two main features, that is, of having radioactivity and continuously release residual heat, so it is required to set up special facilities for spent fuel storage.

Through several decades of development, a complete nuclear power system has formed in China, several types of nuclear power plants have been developed and introduced, including pressurized water reactor, heavy water reactor and so forth, where the storage method of spent fuel is mainly pool storage. While developing water reactor nuclear power plants, the technology of utilizing high temperature gas-cooled reactor for power generation has also been developed continuously in China. At present, a demonstration project of high temperature gas-cooled reactor nuclear power plant supported by National Science and Technology Major Project is carrying out, and the design of the project has been completed basically. Different from the pressurized water reactor nuclear power plant, the spent fuel storage technology of the demonstration project fully utilizes the air cooled dry silo storage method for the spent fuel storage canister, which can solve the hazard of loss of coolant accident of the spent fuel pool storage method, and improves the overall safety of high temperature reactor nuclear power plant.

The pebble bed modular high temperature gas-cooled reactor nuclear power plant developed in China has main features of the fourth generation nuclear power plants, which comprise inherent safety, preventing nuclear proliferation, producing high temperature process heat and so on. The pebble bed high temperature gas-cooled reactor utilizes spherical fuel elements with graphite matrix, and the outer diameter of the element is 60 mm. After the spent fuel elements are discharged from the reactor core in high temperature reactor, the spent fuel elements can be loaded into special spent fuel storage canisters, and all of the storage canisters are stored in the spent fuel dry storage facilities.

In summary, at present, the pool storage method still is the main storage method for spent fuel in nuclear power plants. The main reason is that the pool storage method can solve the issue of radiation shielding and residual heat removal conveniently, that is, water has the function of radiation shielding and can serve as a carrier for residual heat to cool spent fuel. However, the pool storage also has several shortcomings, which lie in that when loss of coolant accident occurs in the pool, if the spent fuel is exposed out of the water level, not only water cannot play the role of radiation shielding, but this situation may also deteriorate residual heat removal conditions of spent fuel, which even results in burnout of spent fuel and release of radioactive materials.

The spent fuel dry storage technology developed recently can solve the issue mentioned above effectively, which is mainly used for the spent fuel that has already been stored in a pool for a while. After that cooling time, the residual heat level of the spent fuel is low, and the radiation dose is reduced also. The spent fuel dry storage technology don't need water sources, so the radiation shielding of the spent fuel mainly depends on storage facilities, and the residual heat removal mainly depends on air cooling.

SUMMARY

The technical problem to be solved by the present disclosure is that there is provided with a residual heat removal ventilation system for spent fuel dry storage facility of nuclear power plant, which can be used to cool spent fuel storage canisters within spent fuel storage facilities of pebble bed high temperature gas-cooled reactor nuclear power plant, and discharge the residual heat of the spent fuel storage canisters to external environment by means of combining forced ventilation and natural ventilation.

A residual heat removal ventilation system for spent fuel dry storage facility of nuclear power plant, which is installed in a spent fuel building, and the spent fuel building comprises a storeroom, an operating room, and a ventilation equipment room sequentially arranged from bottom to top. A ventilation heat shield cylinder is disposed in each silo of the storeroom, and the storeroom comprises a buffer storage region and intermediate storage regions, a buffer storage region cold air intake chamber and a buffer storage region hot air removal chamber are disposed at an upper part of the buffer storage region, which are separated by a buffer storage region cold and hot air chamber separator, wherein, the buffer storage region hot air removal chamber is located above the buffer storage region cold air intake chamber.

A buffer storage region cold air pipe is connected to an upper part of the buffer storage region cold air intake chamber, and the buffer storage region cold air pipe extends from the operating room to the ventilation equipment room, and a buffer storage region cold air inlet connected with the buffer storage region cold air pipe is disposed on the wall of the operating room, such that cold air enters into the buffer storage region cold air intake chamber from the buffer storage region cold air pipe, enters into a cold air channel of silos of the buffer storage region through the buffer storage region cold air intake chamber, enters into the ventilation heat shield cylinder from an air inlet of the ventilation heat shield cylinder, and enters into the buffer storage region hot air removal chamber through an air outlet of the ventilation heat shield cylinder. A buffer storage region first heat removal pipe is connected to an upper part of the buffer storage region hot air removal chamber. The buffer storage region first heat removal pipe extends from the operating room to the ventilation equipment room, and connect with a buffer storage region ventilation heat removal vent on the top of the ventilation equipment room through the first air valve.

A buffer storage region second heat removal pipe, an air cooling equipment, a buffer storage region heat removal fan and a bypass air pipe are disposed in the ventilation equipment room. The buffer storage region second heat removal pipe, the air cooling equipment, and the bypass air pipe are connected in parallel with the buffer storage region first heat removal pipe respectively. The buffer storage region second heat removal pipe is connected with the buffer storage region ventilation heat removal vent through the second air valve. The inlets of the air cooling equipment and the bypass air pipe are connected to the third air valve and the fourth air valve respectively. The outlets of the air cooling equipment and the bypass air pipe are both connected to an inlet of the buffer storage region heat removal fan. An outlet of the buffer storage region heat removal fan is connected to the buffer storage region first heat removal pipe and the buffer storage region second heat removal pipe through the fifth air valve and the sixth air valve respectively.

Preferably, the storeroom further comprises second-period intermediate storage region isolated from the buffer storage region, second-period intermediate storage region cold air intake chamber and second-period intermediate storage region hot air removal chamber, which are separated by the second-period intermediate storage region cold and hot air chamber separator, are disposed at an upper part of the second-period intermediate storage region, and the second-period intermediate storage region hot air removal chamber is located above the second-period intermediate storage region cold air intake chamber.

The second-period intermediate storage region cold air pipe is connected to an upper part of the second-period intermediate storage region cold air intake chamber, and the second-period intermediate storage region cold air pipe extends from the operating room to the ventilation equipment room, and the second-period intermediate storage region cold air inlet connected with the second-period intermediate storage region cold air pipe is disposed on the wall of the operating room, such that cold air enters into the second-period intermediate storage region cold air intake chamber through the second-period intermediate storage region cold air pipe, enters into cold air channel of the silos of the second-period intermediate storage region through the second-period intermediate storage region cold air intake chamber, enters into the ventilation heat shield cylinder from the air inlet of the ventilation heat shield cylinder, and enters into the second-period intermediate storage region hot air removal chamber through the air outlet of the ventilation heat shield cylinder. The second-period intermediate storage region heat removal pipe is connected to an upper part of the second-period intermediate storage region hot air removal chamber, the second-period intermediate storage region heat removal pipe extends from the operating room to the ventilation equipment room, and connect with the second-period intermediate storage region ventilation heat removal vent on the top of the ventilation equipment room through the seventh air valve.

Preferably, the storeroom further comprises first-period intermediate storage region separated from the buffer storage region and the second-period intermediate storage region.

The first-period intermediate storage region cold air intake chamber and the first-period intermediate storage region hot air removal chamber separated by the first-period intermediate storage region cold and hot air chamber separator are disposed at an upper part of the first-period intermediate storage region, and the first-period intermediate storage region hot air removal chamber is located above the first-period intermediate storage region cold air intake chamber. The first-period intermediate storage region cold air pipe is connected to an upper part of the first-period intermediate storage region cold air intake chamber, and the first-period intermediate storage region cold air pipe extends from the operating room to the ventilation equipment room, and the first-period intermediate storage region cold air inlet connected with the first-period intermediate storage region cold air pipe is disposed on the wall of the operating room, such that cold air enters into the first-period intermediate storage region cold air intake chamber through the first-period intermediate storage region cold air intake chamber, enters into cold air channel of the silos of the first-period intermediate storage region through the first-period intermediate storage region cold air intake chamber, enters into the ventilation heat shield cylinder from the air inlet of the ventilation heat shield cylinder, and enters into the first-period intermediate storage region hot air removal chamber through the air outlet of the ventilation heat shield cylinder. The first-period intermediate storage region heat removal first pipe is connected to an upper part of the first-period intermediate storage region hot air removal chamber, the first-period intermediate storage region heat removal first pipe extends from the operating room to the ventilation equipment room, and connect with the first-period intermediate storage region ventilation heat removal vent on the top of the ventilation equipment room through the eighth air valve.

The first-period intermediate storage region heat removal second pipe, the first-period intermediate storage region heat removal fan and a ventilation pipe are disposed in the ventilation equipment room. The first-period intermediate storage region heat removal second pipe and the ventilation pipe are connected in parallel with the buffer storage region first heat removal pipe respectively. The first-period intermediate storage region heat removal second pipe is connected with the first-period intermediate storage region ventilation heat removal vent through the ninth air valve. The ventilation pipe is connected with the first-period intermediate storage region heat removal fan, and an outlet of the first-period intermediate storage region heat removal fan is connected to the first-period intermediate storage region heat removal first pipe through the tenth air valve and to the first-period intermediate storage region heat removal second pipe through the eleventh air valve.

Preferably, the buffer storage region heat removal fan and the first-period intermediate storage region heat removal fan both comprise two working heat removal fans and one backup heat removal fan.

Preferably, the buffer storage region is separated from the first-period intermediate storage region by the first partition, and the first-period intermediate storage region is separated from the second-period intermediate storage region by the second partition.

Preferably, the number of the buffer storage region cold air inlet, the second-period intermediate storage region cold air inlet, the first-period intermediate storage region cold air inlet, the buffer storage region ventilation heat removal vent, the second-period intermediate storage region ventilation heat removal vent and the first-period intermediate storage region ventilation heat removal vent is multiple.

Preferably, an operating room roof is disposed at the top of the operating room, and a supporting beam is disposed below the operating room roof. The buffer storage region cold air pipe, the buffer storage region first heat removal pipe, the buffer storage region second heat removal pipe, the first-period intermediate storage region cold air pipe, the first-period intermediate storage region heat removal first pipe, the first-period intermediate storage region heat removal second pipe, the second-period intermediate storage region cold air pipe and the second-period intermediate storage region heat removal pipe are all disposed at the same side. The buffer storage region cold air pipe, the buffer storage region first heat removal pipe, and the buffer storage region second heat removal pipe are disposed in correspondence to the buffer storage region. The first-period intermediate storage region cold air pipe, the first-period intermediate storage region heat removal first pipe, and the first-period intermediate storage region heat removal second pipe are disposed in correspondence to the first-period intermediate storage region. The second-period intermediate storage region cold air pipe and the second-period intermediate storage region heat removal pipe are disposed in correspondence to the second-period intermediate storage region.

Preferably, a silo mouth floorslab is disposed at the top of the storeroom, a silo mouth corresponding to each silo is disposed on the silo mouth floorslab, and each of the silo mouth is provided with a silo plug accordingly. A bottom extremity of the ventilation heat shield cylinder is fixed on the floor of the spent fuel building, and a top of the ventilation heat shield cylinder extends to the outlet of the silo under silo mouth floorslab. An air inlet of the ventilation heat shield cylinder is arranged circumferentially along the bottom of the ventilation heat shield cylinder. The silo guide-rails extending from the floor of the spent fuel building to the silo mouth floorslab are fixed with the internal side of the ventilation heat shield cylinder, the silo guide-rails are used for the guidance of the storage canister in the hoisting process, and the silo guide-rails are fixed to the silo outer wall by lateral supporting. The ventilation heat shield cylinder and the silo guide-rails are both segmented.

Preferably, multilayer anti-seismic floorslabs are disposed between the silos and the outer wall of the spent fuel building.

Preferably, a temperature measuring room and a transport room are disposed between the spent fuel storeroom and the spent fuel building outer wall. The temperature measuring room is located under the ground, and the transport room is located above the ground. Several through-wall storage canister temperature measuring apparatuses are disposed on internal wall of the temperature measuring room and the transport room.

The residual heat removal ventilation system for dry storage of spent fuel of nuclear power plant provided by the present disclosure is mounted in the spent fuel building without storing the spent fuel in a pool storage manner. The safety of the spent fuel does not rely on power equipment such as pump or fans, thus not only reducing routine maintenance, saving energy, but also have inherent safety. Furthermore, the residual heat removal ventilation system for dry storage of spent fuel of nuclear power plant of the present disclosure can be used to cool spent fuel storage canisters within spent fuel storage facilities of pebble bed high temperature gas-cooled reactor nuclear power plant, and discharge residual heat of spent fuel storage canisters to the external environment by means of combining forced ventilation and natural ventilation.

Figure 1:
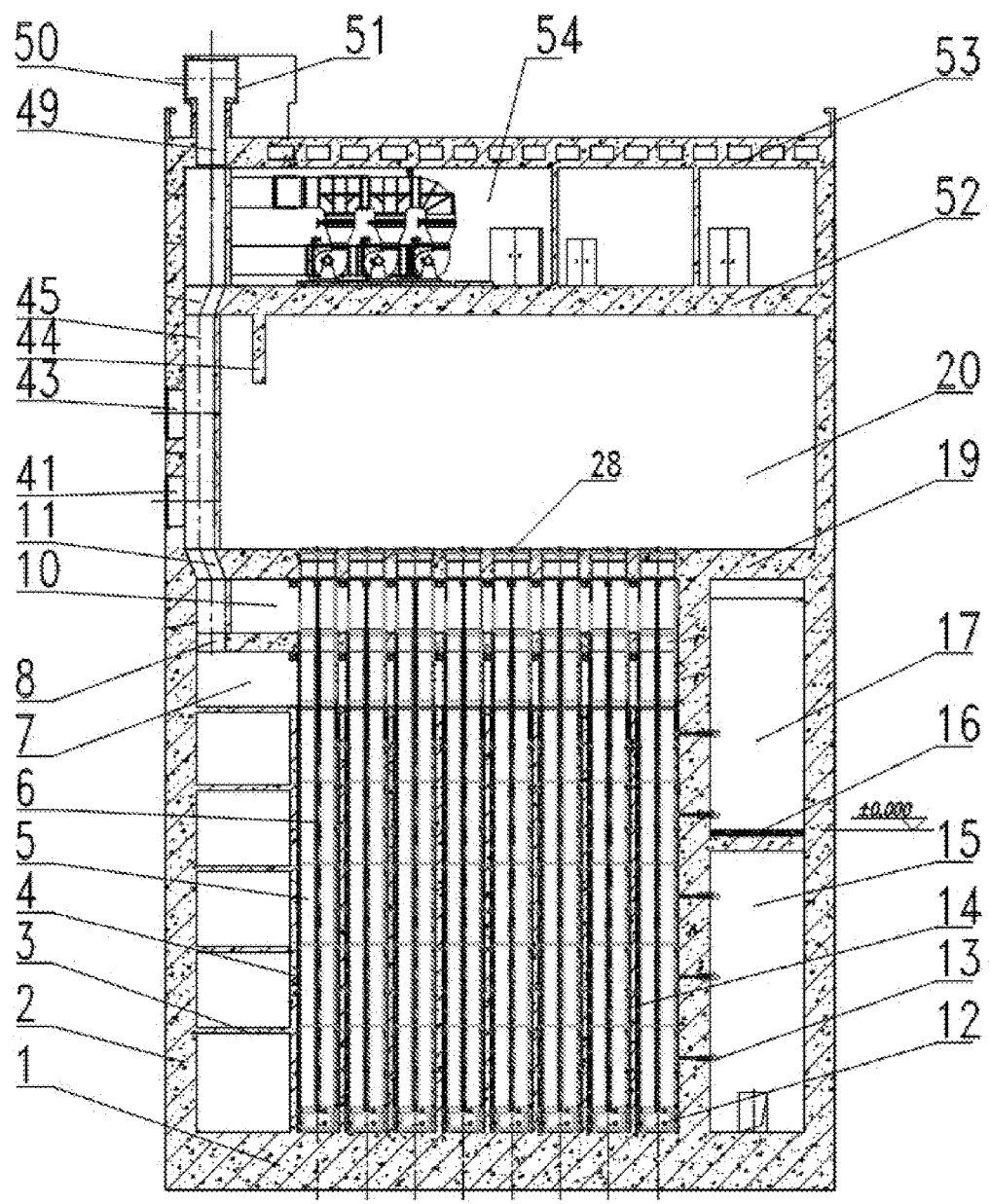
FIG. 1 is a front schematic diagram of a spent fuel building mounted with the residual heat removal ventilation system for dry storage of spent fuel of nuclear power plant of an embodiment.

LIST OF REFERENCE NUMBERS 1. spent fuel building floor; 2. spent fuel building outer wall; 3. anti-seismic floor; 4. silo outer wall; 5. ventilation heat shield cylinder; 6. silo guide-rail; 7. buffer storage region cold air intake chamber; 8. air intake chamber cold air vent; 10. buffer storage region hot air removal chamber; 11. cold air through hole; 12. storage canister seat; 13. storage canister temperature measuring apparatus; 14. silo partition; 15. temperature measuring room; 16. ground; 17. transport room; 19. silo mouth floorslab; 20. operating room; 21. first partition; 22. second-period intermediate storage region cold and hot air chamber separator; 23. first-period intermediate storage region cold air intake chamber; 24. second-period intermediate storage region cold air intake chamber; 25. first-period intermediate storage region hot air removal chamber; 26. second-period intermediate storage region hot air removal chamber; 27. second partition; 28. silo plug; 41&43. buffer storage region cold air inlet; 44. supporting beam; 45. buffer storage region cold air pipe; 49. buffer storage region first heat removal pipe; 50&51. buffer storage region ventilation heat removal vent; 52. operating room roof; 53. spent fuel building roof; 54. ventilation equipment room; 55&56. first-period intermediate storage region cold air inlet; 57. first-period intermediate storage region cold air pipe; 58. first-period intermediate storage region heat removal first pipe; 59&60. second-period intermediate storage region cold air inlet; 61. second-period intermediate storage region heat removal pipe; 62. second-period intermediate storage region cold air pipe; 64. eighteenth air valve; 71. buffer storage region second heat removal pipe; 72. third air valve; 73. air cooling equipment; 74. nineteenth air valve; 75. twelfth air valve; 76. first buffer storage region heat removal fan; 77. second buffer storage region heat removal fan; 78. fourteenth air valve; 79. sixteenth air valve; 80. third buffer storage region heat removal fan; 81. fourth air valve; 82. twentieth air valve; 83. first first-period intermediate storage region heat removal fan; 84. second first-period intermediate storage region heat removal fan; 85. twenty-second air valve; 86. third first-period intermediate storage region heat removal fan; 87. twenty-fourth air valve; 88. seventeenth air valve; 89. fifteenth air valve; 90. thirteenth air valve; 91. fifth air valve; 92. sixth air valve; 93. first air valve; 94. second air valve; 95. eighth air valve; 96. ninth air valve; 97. twenty-first air valve; 98. twenty-third air valve; 99. twenty-fifth air valve.

DETAILED DESCRIPTION

Embodiments of the present disclosure are further described in detail below in combination with the accompanying drawings and embodiments. The following embodiments are used to explain the present disclosure, but cannot be used to limit the scope of the present disclosure.

In the description of the present disclosure, it is to be noted that the orientation or position relationship indicated by terms "center", "longitudinal", "lateral", "up", "down", "front", "rear", "left", "right", "vertical", "horizontal", "top", "bottom", "inside", "outside" and so forth is based on the orientation or position relationship illustrated by the accompanying drawings, they are only for the convenience of describing the present disclosure and simplifying the description, rather than indicating or implying that the equipment or element referred to must have a particular orientation, be constructed and operated in a particular orientation, and thus, cannot be interpreted as a limitation of the present disclosure. Furthermore, terms "first," "second," and "third" are used for descriptive purposes only and are not to be construed as indicating or implying relative importance.

First, it is to be noted that the present embodiments only explain by taking the residual heat removal ventilation system for dry storage of spent fuel of nuclear power plant applied in the pebble bed modular high temperature reactor nuclear power plant as an example. It is apparent that the residual heat removal ventilation system for dry storage of spent fuel of nuclear power plant of the present application can be used for spent fuel canisters in dry storage facilities of spent fuel of other types of nuclear power plants by suitable modifications.

The residual heat removal ventilation system for dry storage of spent fuel of nuclear power plant of the present embodiments is disposed in the spent fuel building, comprising some cases where the structure is disposed in the roof of the spent fuel building or on the wall of the spent fuel building. Wherein, the spent fuel building comprises a storeroom, an operating room 20, and a ventilation equipment room 54 sequentially arranged from bottom to top.

The storeroom in the present embodiment consists of fifty-six silos for storage, and it is apparent that the number of the silos in the storeroom can be changed depend on working requirement. The bottom of the storeroom is spent fuel building floor 1, the outer periphery is spent fuel building outer wall 2, and the top is silo mouth floorslab 19. Inside the storeroom, a square silo is enclosed by the silo outer wall 4, wherein the shape of the silo is not limited. Storage canister seats 12 are disposed in the bottom center of the silo for placing and protecting storage canisters. A ventilation heat shield cylinder 5 is arranged in the silo, wherein the ventilation heat shield cylinder 5 is supported on the spent fuel building floor 1. Air inlets are disposed circumferentially on the bottom of the ventilation heat shield cylinder 5, which allows cooling air coming from the upper part flows into the ventilation heat shield cylinder 5 through the air inlets on the bottom, thereby cooling spent fuel storage canisters.

Silo guide-rails 6 are fixed with the internal side of the ventilation heat shield cylinder 5 for the guidance of the storage canister when hoisting in the silo, and the silo guide-rails 6 are fixed to the silo outer wall 4 by lateral supporting. The silo guide-rails 6 extend from the spent fuel building floor 1 up to the silo mouth floorslab 19, such that spent fuel storage canisters have the reliable guidance throughout the hoisting process in the silo. The ventilation heat shield cylinder 5 and the silo guide-rails 6 can be processed in segments for the convenience of installation after the civil construction of spent fuel building is completed. A silo mouth is disposed on the silo mouth floorslab 19 for each storage silo, for the spent fuel storage canisters to enter and exit the storage silo. A silo plug 28 is placed in the silo mouth, which can shield radiation in the silo.

Preferably, four guide-rails are disposed inside the heat shield cylinder, wherein, guide-rails are evenly fixed to the embedded plate of the silo partition 14 at multiple parts in the vertical direction, which guarantees that the guide-rail stiffness satisfies requirements for canister hoisting.

Multilayer anti-seismic floorslabs are disposed at the positions between the silos and the spent fuel building outer wall 2, such that each silo satisfies anti-seismic requirements.

A temperature measuring room 15 and a transport room 17 for spent fuel are disposed in proximity to external side in the storeroom. Wherein, the temperature measuring room 15 is located under the ground 16, and the transport room 17 is located above the ground 16. A through-wall storage canister temperature measuring apparatus 13 is disposed on the wall of the temperature measuring room 15 and the transport room 17 in proximity to the silo (that is, on the internal wall), which can continuously measures wall surface temperature near the spent fuel canisters after loading the spent fuel canisters into the storeroom and ensure safe operation of the residual heat removal ventilation system.

Wherein, the through-wall storage canister temperature measuring apparatus 13 may be a through-wall thermocouple that can be mounted through the wall and the heat shield cylinder. The through-wall thermocouple is provided with a waterproof seal to prevent water leakage failure in the storeroom. It can monitor the temperature status of the spent fuel canisters in real time and can alarm timely after the failure occurs by thermocouple, which helps operators to make correct judgment and improve the operating safety of the residual heat removal ventilation system.

The spent fuel operating room 20 is disposed above the storeroom, in which transport apparatuses for spent fuel storage canisters can be disposed, such that the spent fuel storage canisters are placed into the silo or taking out of the silo from the silo mouth. An operating room roof 52 is disposed above the operating room 20. Due to the large span of the operation room 20, a supporting beam 44 is disposed below the operation room roof 52 to enhance the anti-seismic safety of the plant.

The spent fuel ventilation equipment room 54 is disposed above the operating room roof 52, which can be used for mounting pipelines, heat removal fans and air valves required by forced ventilation in the spent fuel storeroom. A ventilation heat removal vent for the spent fuel storeroom is also disposed above the spent fuel ventilation equipment room 54.

The storeroom of the present embodiment may be divided into a buffer storage region, a first-period intermediate storage region, and a second-period intermediate storage region. Of course, wherein the number of the first-period intermediate storage region and the second-period intermediate storage region may be zero, and may also be any positive integer. For the case where the number of the first-period intermediate storage region or the second-period intermediate storage region is zero, that is, the first-period intermediate storage region or the second-period intermediate storage region is independently disposed relative to the buffer storage region. And each independent storage region is provided with residual heat removal ventilation subsystems independent of each other.

Figure 2:
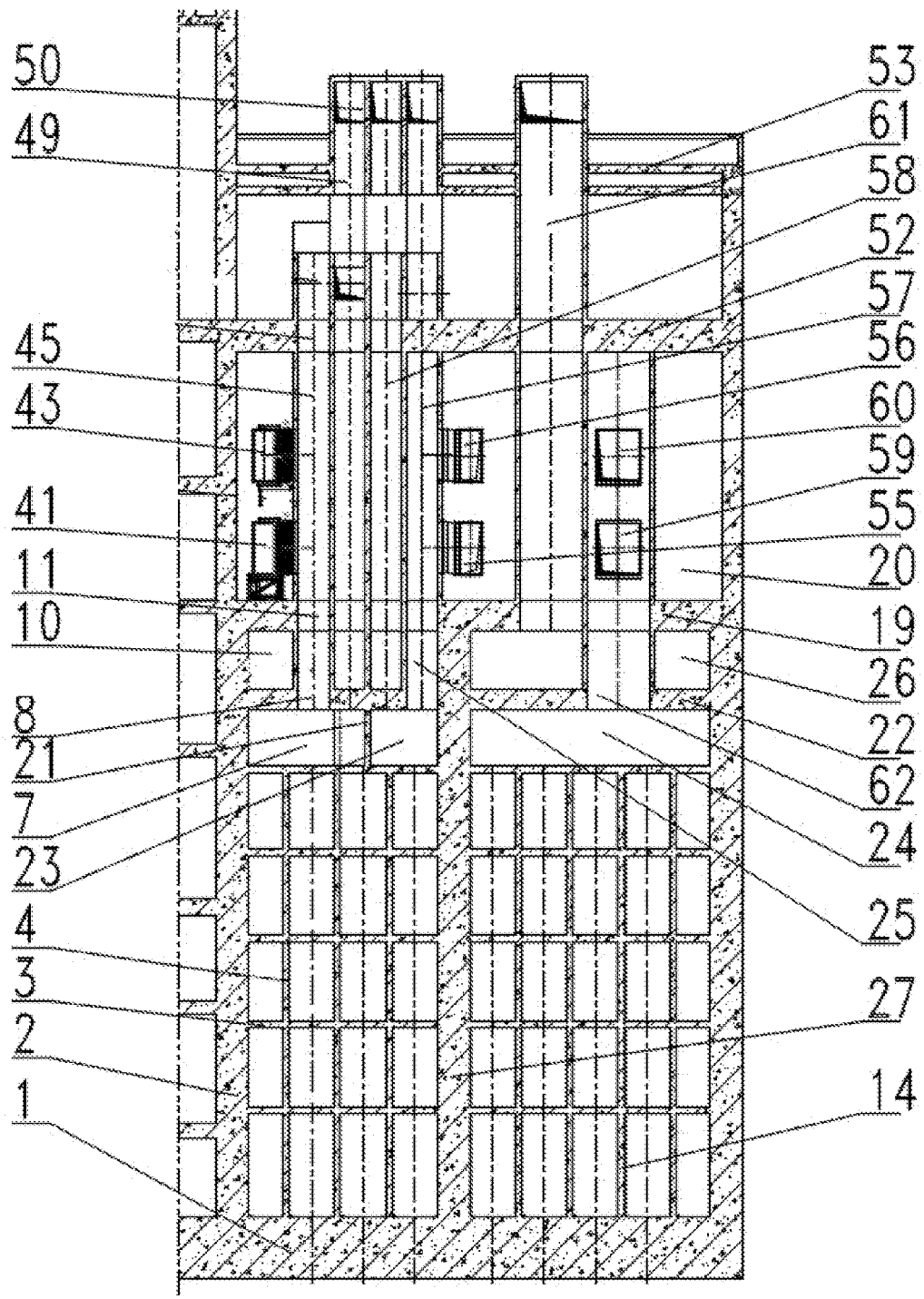
FIG. 2 is a side schematic diagram of a spent fuel building mounted with the residual heat removal ventilation system for dry storage of spent fuel of nuclear power plant of an embodiment.
Figure 3:
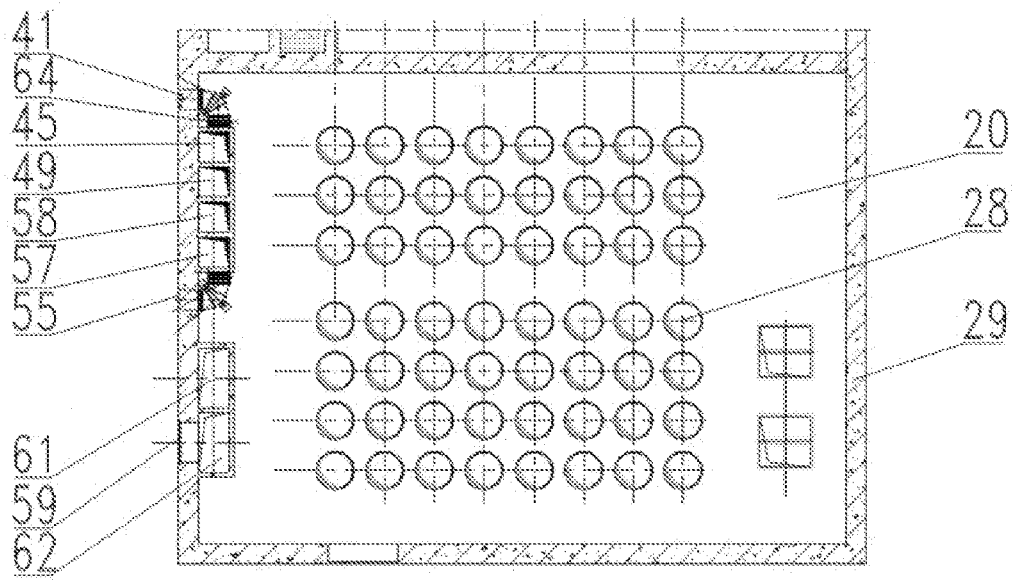
FIG. 3 is a top schematic diagram of a spent fuel building mounted with the residual heat removal ventilation system for dry storage of spent fuel of nuclear power plant of an embodiment.

Referring to FIGS. 1-3, the present embodiment only explains by taking as an example a case where the storeroom comprises a buffer storage region, a first-period intermediate storage region and a second-period intermediate storage region, which are isolated from each other.

Wherein, a cold air intake chamber, a hot air removal chamber and a cold and hot air chamber separator that separates the cold air intake chamber from the hot air removal chamber are disposed in correspondence to each storage region.

It is to be noted that corresponding to different storage regions, the cold air intake chamber is named as buffer storage region cold air intake chamber 7, first-period intermediate storage region cold air intake chamber 23 and second-period intermediate storage region cold air intake chamber 24, the hot air removal chamber is named as buffer storage region hot air removal chamber 10, first-period intermediate storage region hot air removal chamber 25 and second-period intermediate storage region hot air removal chamber 26, and the cold and hot air chamber separator is named as buffer storage region cold and hot air chamber separator, first-period intermediate storage region cold and hot air chamber separator and second-period intermediate storage region cold and hot air chamber separator 22, and the naming of other structures follows the principle in the same way.

Further referring to FIG. 3, wherein the eight silos in the top row are corresponded to the buffer storage region, a total of sixteen silos in the middle two rows are corresponded to the first-period intermediate storage region, and a total of thirty-two silos in the last four rows are corresponded to the second-period intermediate storage region.

Based on this, preferably but not necessarily, each of the cooling pipes and the heat removal pipes isolated from each other in the storage region are disposed at the same side. Specifically, the buffer storage region cold air intake chamber 7 and the buffer storage region hot air removal chamber 10 are disposed at an upper part of the buffer storage region, wherein the buffer storage region cold air intake chamber 7 and the buffer storage region hot air removal chamber 10 are separated by the buffer storage region cold and hot air chamber separator, and the buffer storage region hot air removal chamber 10 are located above the buffer storage region cold air intake chamber 7.

The buffer storage region cold air pipe 45 is connected to the upper part of the buffer storage region cold air intake chamber 7, the buffer storage region cold air pipe 45 extends from the operating room 20 to the ventilation equipment room 54, and buffer storage region cold air inlets (41, 43) connected with the buffer storage region cold air pipe 45 are disposed on the wall of the operating room 20. Cold air may enter from the buffer storage region cold air inlets (41, 43), then into the buffer storage region cold air intake chamber 7 through the buffer storage region cold air pipe 45, then into the cold air channel of the silos in the buffer storage region through the buffer storage region cold air intake chamber 7, and into the ventilation heat shield cylinder 5 from the air inlet on the bottom of the ventilation heat shield cylinder 5. After entering into the ventilation heat shield cylinder 5, cold air moves up along the length direction of the ventilation heat shield cylinder 5, and finally enters into the buffer storage region hot air removal chamber 10 through the air outlet of the ventilation heat shield cylinder 5. The buffer storage region first heat removal pipe 49 is connected to the upper part of the buffer storage region hot air removal chamber 10, the buffer storage region first heat removal pipe 49 extends from the operating room 20 to the ventilation equipment room 54, and the buffer storage region first heat removal pipe 49 is connected with the buffer storage region ventilation heat removal vents (50, 51) on the top of the ventilation equipment room 54 through first air valve 93.

Wherein, an air intake chamber cold air vent 8 is disposed on the buffer storage region cold and hot air chamber separator, from which cold air enters into the buffer storage region cold and hot air chamber separator 7. It is to be noted that the buffer storage region cold air pipe 45 is connected with the buffer storage region cold air intake chamber 7 after passing through the buffer storage region hot air removal chamber 10.

Furthermore, the ventilation heat shield cylinder 5 passes upward to the buffer storage region cold and hot air chamber separator from the spent fuel building floor 1, wherein a sealing structure is disposed between the ventilation heat shield cylinder 5 and the cold and hot air chamber separator, which guarantees that after flowing into the buffer storage region cold air intake chamber 7, cooling air will not bypass into the buffer storage region hot air removal chamber 10 from the gap between the ventilation heat shield cylinder 5 and the buffer storage region cold and hot air chamber separator. And it is apparent that the bypass flow is not beneficial to the cooling of the spent fuel storage canisters in the silo.

Figure 4:
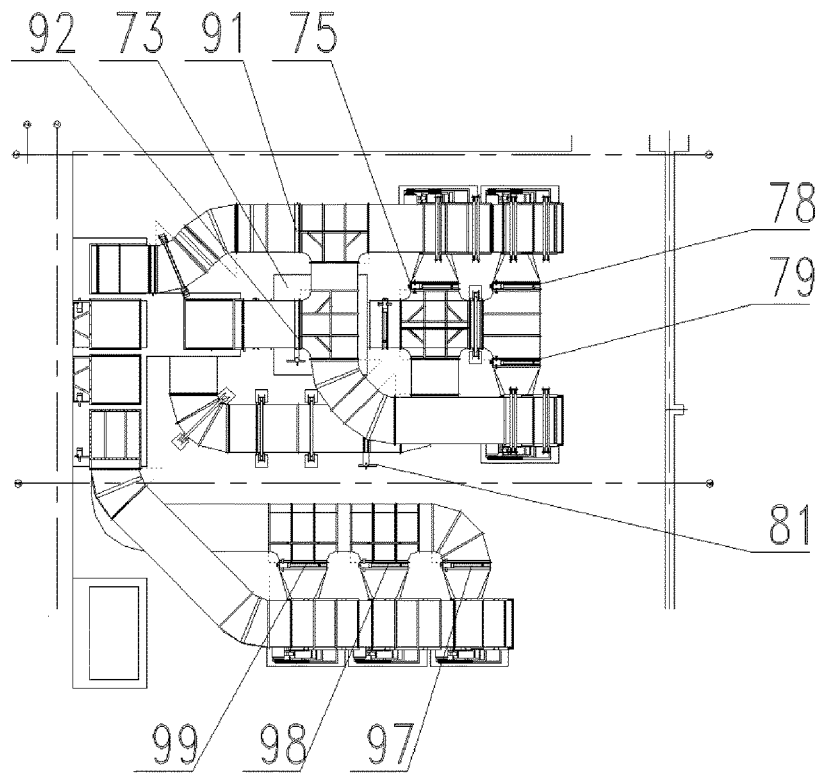
FIG. 4 is a structural schematic diagram of upper layer pipelines of the residual heat removal ventilation system for dry storage of spent fuel of nuclear power plant of an embodiment.
Figure 5:
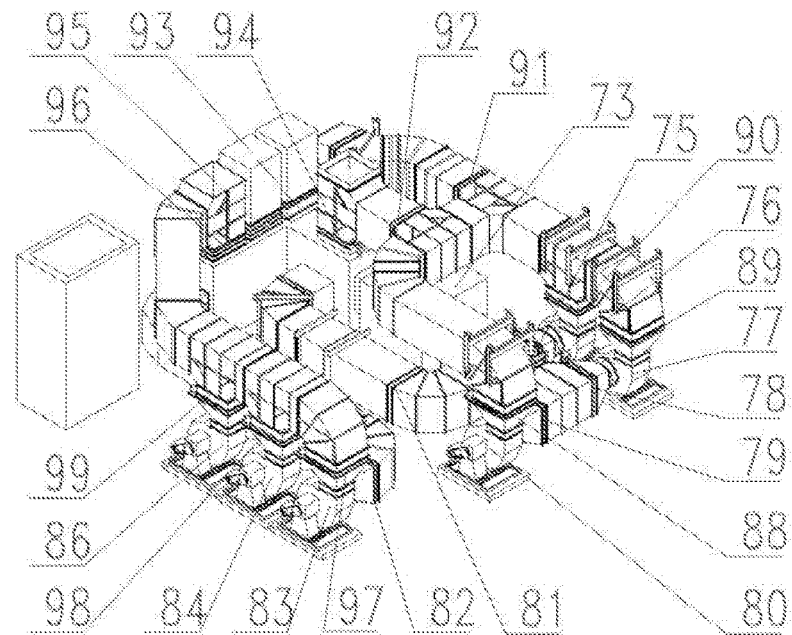
FIG. 5 is a structural isometric schematic diagram of the residual heat removal ventilation system for dry storage of spent fuel of nuclear power plant of an embodiment.
Figure 6:
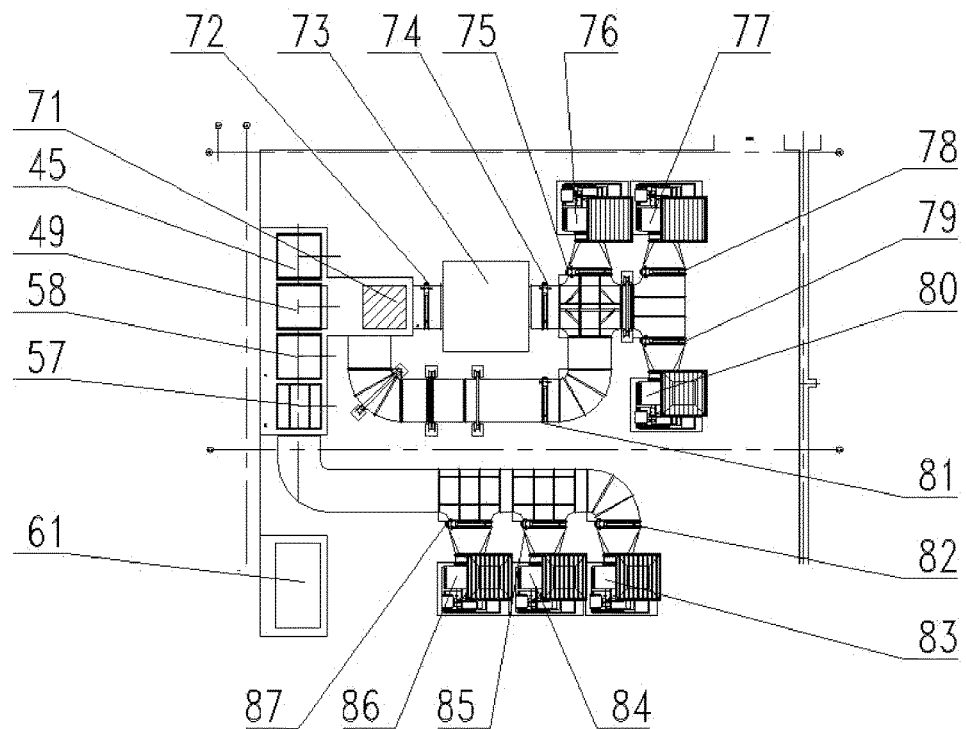
FIG. 6 is a structural schematic diagram of lower layer pipelines of the residual heat removal ventilation system for dry storage of spent fuel of nuclear power plant of an embodiment.

Based on this, a buffer storage region second heat removal pipe 71, an air cooling equipment 73, a buffer storage region heat removal fan and a bypass air pipe are disposed in the ventilation equipment room 54. Referring to FIGS. 4-6, the buffer storage region second heat removal pipe 71, the air cooling equipment 73 and the bypass air pipe are connected in parallel with the buffer storage region first heat removal pipe 49 respectively. The buffer storage region second heat removal pipe 71 is connected with the buffer storage region ventilation heat removal vents (50, 51) through the second air valve 94. The inlets of the air cooling equipment 73 and the bypass air pipe are connected to the third air valve 72 and the fourth air valve 81, the outlets of the air cooling equipment 73 and the bypass air pipe are both connected into an inlet of the heat removal fan, and an outlet of the heat removal fan is connected to the buffer storage region first heat removal pipe 49 and the buffer storage region second heat removal pipe 71 through the fifth air valve 91 and the sixth air valve 92 respectively.

Furthermore, air valves may be disposed between the air cooling equipment 73 and the heat removal fans and at the inlet position and outlet position of the heat removal fan. Specifically, the number of the heat removal fans that are connected with the air cooling equipment 73 and the outlet of the bypass air pipe is three, that is, the first buffer storage region heat removal fan 76, the second buffer storage region heat removal fan 77 and the third buffer storage region heat removal fan 80. The inlet and outlet of the first buffer storage region heat removal fan 76 is connected with the twelfth air valve 75 and the thirteenth air valve 90 respectively. The inlet and outlet of the second buffer storage region heat removal fan 77 is connected with the fourteenth air valve 78 and the fifteenth air valve 89 respectively. The inlet and outlet of the third buffer storage region heat removal fan 80 is connected with the sixteenth air valve 79 and the seventeenth air valve 88 respectively.

The outlets of the first buffer storage region heat removal fan 76, the second buffer storage region heat removal fan 77 and the third buffer storage region heat removal fan 80 are connected with ventilation pipes, which constitute an upper-layer air pipe system of the ventilation equipment room 54. After converging, the upper-layer air pipes have two directions, wherein, one direction used for controlling the operation mode of close loop forced ventilation which converges to the buffer storage region first heat removal pipe 49 through the fifth air valve 91, and the other direction used for controlling the operation mode of open loop forced ventilation which converges to the buffer storage region second heat removal pipe 71 through the sixth air valve 92. Whereas the first air valve 93 above the buffer storage region first heat removal pipe 49, the buffer storage region second heat removal pipe 71 and the second air valve 94 are used to control the natural ventilation system. The heat removal pipes above the first air valve 93 and the second air valve 94 pass to the buffer storage region ventilation heat removal vents (50, 51).

It is preferred that the number of the buffer storage region ventilation heat removal vents (50, 51) is multiple, preferably two, and distributed symmetrically on the spent fuel building, and thus the residual heat can be effectively discharged in any condition of wind direction. Furthermore, it is preferred that the number of the buffer storage region cold air inlets (41, 43) is multiple.

Corresponding to the residual heat removal ventilation system of the buffer storage region, it specifically comprises three operation modes.

In the two operation modes of open natural ventilation and open forced ventilation, cold air flows into the buffer storage region cold air pipe 45 in the ventilation equipment room 54 from the buffer storage region cold air inlets (41, 43). The eighteenth air valve 64 is disposed at the junction position of the ventilation equipment room 54 and the operating room 20 on the buffer storage region cold air pipe 45. In the case where the eighteenth air valve 64 is opened, cold air directly enters into the buffer storage region cold air pipe 45 in the operating room 20, flows downward through the cold air through-hole 11 on the silo mouth floorslab 19, and enters into the buffer storage region cold air intake chamber 7. In the buffer storage region cold air intake chamber 7, cold air is distributed to flow into the cold air pipe in each silo in the buffer storage region, flows downward to the bottom of the silo along the external side of the ventilation heat shield cylinder 5, then flows into the internal side of the ventilation heat shield cylinder 5 from the inlet on the bottom of the ventilation heat shield cylinder 5, cools the spent fuel storage canisters placed in the ventilation heat shield cylinder 5, becomes hot air after carrying away residual heat emitted from the spent fuel storage canisters, and flows into the buffer storage region hot air removal chamber 10 from the top of the ventilation heat shield cylinder 5. After converging with hot air that flows out of other silos, it flows into the buffer storage region heat removal pipe in the operating room 20, and flows upwards to the buffer storage region first heat removal pipe 49 in the ventilation equipment room 54.

In the case where the buffer storage region is in the operation mode of the open natural ventilation: the first air valve 93 above the buffer storage region first heat removal pipe 49 and the second air valve 94 above the buffer storage region second heat removal pipe 71 are both in open status, and at the same time, the fifth air valve 91 is in close status, and the sixth air valve 92 is in close status, and thus, hot air flows through the first air valve 93 and the second air valve 94, flows upwards to the spent fuel building roof 53, and discharges to the external environment from the buffer storage region ventilation heat removal vents (50, 51).

In the case where the buffer storage region is in the operation mode of the open forced ventilation: the operation control in the ventilation equipment room 54 is different from the case above. After hot air flows into the buffer storage region first heat removal pipe 49 and the buffer storage region second heat removal pipe 71 in the ventilation equipment room 54 from the buffer storage region hot air removal chamber 10, the first air valve 93 and the second air valve 94 are both in open status, and at the same time, the fifth air valve 91 is in close status, and the sixth air valve 92 is in open status, and thus, the hot air flow cannot flow upwards to the spent fuel building roof 53 through the first air valve 93 and the second air valve 94, and can only flow into the ventilation pipe at the rear of the buffer storage region second heat removal pipe 71 from the buffer storage region second heat removal pipe 71.

Furthermore, in this mode, the third air valve 72 in the front of the air cooling equipment 73 and the nineteenth air valve 74 at the rear of the air cooling equipment 73 are both closed, and the fourth air valve 81 on the bypass air pipe is opened. After flowing out of the lower part of the buffer storage region second heat removal pipe 71, hot air flows into the bypass air pipe, enters the subsequent air pipes through the bypass air pipe, and finally flows into the heat removal fan.

During normal operation, in the three buffer storage region heat removal fans in the present embodiment, only two of them are operating, and another one is backup. The air valves in the front of and at the rear of the operating heat removal fans are all in open status, and the air valves in the front of and at the rear of the backup heat removal fan are all in close status. The design of two in operation and one in backup could improve the reliability of the operation of the residual heat removal ventilation system and the safety of the residual heat removal.

As an example, the first buffer storage region heat removal fan 76 and the second buffer storage region heat removal fan 77 are operated. The twelfth air valve 75 in the front of the first buffer storage region heat removal fan 76 and the thirteenth air valve 90 at the rear of the first buffer storage region heat removal fan 76, and the fourteenth air valve 78 in the front of the second buffer storage region heat removal fan 77 and the fifteenth air valve 89 at the rear of the second buffer storage region heat removal fan 77 are all in open status, whereas the sixteenth air valve 79 in the front of the third buffer storage region heat removal fan 80 and the seventeenth air valve 88 at the rear of the third buffer storage region heat removal fan 80 are both in close status.

After flowing through the first buffer storage region heat removal fan 76 and the second buffer storage region heat removal fan 77 and being boosted, the hot air flows through the air valves disposed at the rear of the first buffer storage region heat removal fan 76 and the second buffer storage region heat removal fan 77, flows into the upper-layer ventilation pipe in the spent fuel ventilation equipment room 54, and converges to the sixth air valve 92 in the upper-layer ventilation pipe. In this mode, the fifth air valve is closed, the sixth air valve is opened, such that after flowing through the sixth air valve, the hot air flows into the upper part of the buffer storage region second heat removal pipe 71, then flows upward to the spent fuel building roof 53, and discharges to the external environment from the buffer storage region ventilation heat removal vents (50, 51).

The differences between the buffer storage region in the operation mode of close loop forced ventilation and that in the operation mode of open loop forced ventilation mainly lie in three points: firstly, cold air does not flow into the buffer storage region cold air pipe 45 from the buffer storage region cold air inlets (41, 43) any longer, but flows back into the buffer storage region cold air intake chamber 7 from the buffer storage region first heat removal pipe 49 in the ventilation equipment room 54; secondly, in the close loop ventilation mode, the third air valve 72 in the front of the air cooling equipment 73 and the nineteenth air valve 74 at the rear of the air cooling equipment 73 are both opened, the fourth air valve 81 on the bypass air pipe is closed. After flowing out of the lower part of the buffer storage region second heat removal pipe 71, hot air flows into the air cooling equipment 73, the residual heat carried by the hot air flow is carried away by cooling water in the air cooling equipment 73, and the hot air flow is cooled to cold air, which then flows to the heat removal fans; thirdly, the cold air that flows out of the heat removal fans converges to the third air valve 72. In the close loop ventilation mode, the third air valve 72 is opened, the fourth air valve 72 is closed, and the cold air flows into the buffer storage region cold air pipe and then flows back into the buffer storage region cold air intake chamber 7.

The first-period intermediate storage region cold air intake chamber 23 and the first-period intermediate storage region hot air removal chamber 25 are disposed at an upper part of the first-period intermediate storage region, wherein the first-period intermediate storage region cold air intake chamber 23 and the first-period intermediate storage region hot air removal chamber 25 are separated by the first-period intermediate storage region cold and hot air chamber separator, and the first-period intermediate storage region hot air removal chamber 25 are located above the first-period intermediate storage region cold air intake chamber 23.

The first-period intermediate storage region cold air pipe 57 is connected to the upper part of the first-period intermediate storage region cold air intake chamber 23, the first-period intermediate storage region cold air pipe 57 extends from the operating room 20 to the ventilation equipment room 54, and first-period intermediate storage region cold air inlets (55, 56) connected with the first-period intermediate storage region cold air pipe 57 are disposed on the wall of the operating room 20. Cold air enters from the first-period intermediate storage region cold air inlets (55, 56), enters into the first-period intermediate storage region cold air intake chamber 23 through the first-period intermediate storage region cold air pipe 57, then enters into the cold air channel of the silos in the first-period intermediate storage region through the first-period intermediate storage region cold air intake chamber 23, and enters into the ventilation heat shield cylinder 5 from the air inlet of the ventilation heat shield cylinder 5. After entering into the ventilation heat shield cylinder 5, cold air moves up along the length direction of the ventilation heat shield cylinder 5, and finally enters into the second-period intermediate storage region hot air removal chamber 26 through the air outlet of the ventilation heat shield cylinder 5. The first-period intermediate storage region heat removal first pipe 49 is connected to the upper part of the first-period intermediate storage region hot air removal chamber 25, the first-period intermediate storage region heat removal first pipe extends from the operating room 20 to the ventilation equipment room 54, and is connected with the first-period intermediate storage region ventilation heat removal vents on the top of the ventilation equipment room 54 through the eighth air valve 95.

Likewise, a sealing structure is disposed between the ventilation heat shield cylinder 5 and the first-period intermediate storage region cold and hot air chamber separator, which guarantees that after flowing into the first-period intermediate storage region cold air intake chamber 23, cooling air will not bypass into the first-period intermediate storage region hot air removal chamber 25 from the gap between the ventilation heat shield cylinder 5 and the first-period intermediate storage region cold and hot air chamber separator. And it is apparent that the bypass flow is not beneficial to the cooling of the spent fuel storage canisters in the silo.

Based on this, the first-period intermediate storage region heat removal second pipe, the first-period intermediate storage region heat removal fan and a bypass air pipe is disposed in the ventilation equipment room 54. The first-period intermediate storage region heat removal second pipe and the ventilation pipe are connected in parallel with the first-period intermediate storage region heat removal first pipe 58. The first-period intermediate storage region heat removal second pipe is connected with the first-period intermediate storage region ventilation heat removal vent through the ninth air valve 96; the ventilation pipe is connected with the first-period intermediate storage region heat removal fan, and an outlet of the first-period intermediate storage region heat removal fan is connected to the first-period intermediate storage region heat removal first pipe 58 through the tenth air valve and to the first-period intermediate storage region heat removal second pipe through the eleventh air valve.

Furthermore, air valves may be disposed at the inlet position and outlet position of the first-period intermediate storage region heat removal fan. Specifically, the number of the first-period intermediate storage region heat removal fans that are connected with the ventilation pipe is three, that is, the first-period intermediate storage region heat removal fan 83, the second first-period intermediate storage region heat removal fan 84 and the third first-period intermediate storage region heat removal fan 86, respectively. The twentieth air valve 82 and the twenty-first air valve 97 are disposed at the inlet and outlet of the first first-period intermediate storage region heat removal fan 83 respectively, the twenty-second air valve 85 and the twenty-third air valve 98 are disposed at the inlet and outlet of the second first-period intermediate storage region heat removal fan 84 respectively, and the twenty-fourth air valve 87 and the twenty-fifth air valve 99 are disposed at the inlet and outlet of the third first-period intermediate storage region heat removal fan 86 respectively.

The outlets of the first first-period intermediate storage region heat removal fan 83, the second first-period intermediate storage region heat removal fan 84 and the third first-period intermediate storage region heat removal fan 86 are connected with ventilation pipes, which constitute an upper-layer air pipe system of the ventilation equipment room 54. After converging, the upper-layer air pipes flows towards the first-period intermediate storage region heat removal second pipe, and the first-period intermediate storage region heat removal second pipe and the first-period intermediate storage region heat removal first pipe 58 is connected. The eighth air valve 95 is disposed on the first-period intermediate storage region heat removal first pipe 58, and the ninth air valve 96 is disposed on the first-period intermediate storage region heat removal second pipe. The eighth air valve 95 and the ninth air valve 96 are used to control the natural ventilation system. The heat removal pipes above the first air valve 93 and the second air valve 94 pass to the first-period intermediate storage region ventilation heat removal vents.

It is preferred that the number of the first-period intermediate storage region ventilation heat removal vents is multiple, preferably two, and distributed symmetrically on the spent fuel building, and thus the residual heat can be effectively discharged in any condition of wind direction.

Furthermore, it is preferred that the number of the first-period intermediate storage region cold air inlets (55, 56) is multiple.

Corresponding to the residual heat removal ventilation sub-system of the buffer storage region, it specifically comprises two operation modes.

In the two operation modes of open loop natural ventilation and open loop forced ventilation, cold air enters from the first-period intermediate storage region cold air inlets (55, 56), then flows downwards through the cold air through-hole 11 on the silo mouth floorslab 19, and enters into the first-period intermediate storage region cold air intake chamber 23. In the first-period intermediate storage region cold air intake chamber 23, cold air is distributed to flow into the cold air pipe in each silo, flows downward to the bottom of the silo along the external side of the ventilation heat shield cylinder 5, then flows into the internal side of the ventilation heat shield cylinder 5 from the opening on the bottom of the ventilation heat shield cylinder 5, cools the spent fuel storage canisters placed in the ventilation heat shield cylinder 5, becomes hot air after carrying away residual heat emitted from the spent fuel storage canisters, and flows into the first-period intermediate storage region hot air removal chamber 25 from the top of the ventilation heat shield cylinder 5, and after converging with hot air that flows out of other silos, flows into the first-period intermediate storage region heat removal first pipe of the first-period intermediate storage region, and flows into the first-period intermediate storage region heat removal first pipe and the first-period intermediate storage region heat removal second pipe of the ventilation equipment room 54.

In the operation mode of the open loop natural ventilation, the eighth air valve 95 and the ninth air valve 96 above the first-period intermediate storage region heat removal first pipe and the first-period intermediate storage region heat removal second pipe are both in open status, and thus, hot air flows through the eighth air valve 95 and the ninth air valve 96, flows upwards to the spent fuel building roof 53, and discharge to the external environment from the first-period intermediate storage region ventilation heat removal vents (50, 51).

In the case where the first-period intermediate storage region is in the operation mode of the open loop forced ventilation, the main differences with the operation mode of the open loop natural ventilation lie in that: the operation control in the ventilation equipment room 54 is different. After hot air flows into the first-period intermediate storage region heat removal first pipe and the first-period intermediate storage region heat removal second pipe in the ventilation equipment room 54 from the first-period intermediate storage region hot air removal chamber 25, in the operation mode of the open loop forced ventilation, the eighth air valve 95 and the ninth air valve 96 are both in close status, and thus, the hot air flow cannot flow upwards to the spent fuel building roof 53 through the eighth air valve 95 and the ninth air valve 96, and can only flow into the heat removal fan from the ventilation pipe at the rear of the first-period intermediate storage region heat removal second pipe.

During normal operation, in the three first-period intermediate storage region heat removal fans in the present embodiment, only two of them are operating, and another one is backup. The air valves in the front of and at the rear of the operating heat removal fans are all in an open status, and the air valves in the front of and at the rear of the backup heat removal fan are all in close status.

As an example, the first first-period intermediate storage region heat removal fan 83 and the second first-period intermediate storage region heat removal fan 84 are operated. The twentieth air valve 82 in the front of the first first-period intermediate storage region heat removal fan 83 and the twenty-first air valve 97 at the rear of the first first-period intermediate storage region heat removal fan 76, and the twenty-second air valve 85 in the front of the second buffer storage region heat removal fan 77 and the twenty-third air valve 98 at the rear of the second buffer storage region heat removal fan 77 are all in open status, whereas the twenty-fourth air valve 87 in the front of the third buffer storage region heat removal fan 80 and the twenty-fifth air valve 99 at the rear of the third buffer storage region heat removal fan 80 are both in close status.

After flowing through the first first-period intermediate storage region heat removal fan 83 and the second first-period intermediate storage region heat removal fan 84 and being boosted, the hot air flows through the air valves disposed at the rear of the first first-period intermediate storage region heat removal fan 83 and the second first-period intermediate storage region heat removal fan 84, flows into the upper-layer ventilation pipe in the ventilation equipment room 54, and converges to the ventilation pipe above the eleventh air valve in the upper-layer ventilation pipe, then flows upwards to the spent fuel building roof 53, and discharge to the external environment from the first-period intermediate storage region ventilation heat removal vent.

The second-period intermediate storage region cold air intake chamber 24 and the second-period intermediate storage region hot air removal chamber 26 are disposed at an upper part of the second-period intermediate storage region, wherein the second-period intermediate storage region cold air intake chamber 24 and the second-period intermediate storage region hot air removal chamber 26 are separated by the second-period intermediate storage region cold and hot air chamber separator 22, and the second-period intermediate storage region hot air removal chamber 26 are located above the second-period intermediate storage region cold air intake chamber 24.

The second-period intermediate storage region cold air pipe 62 is connected to the upper part of the second-period intermediate storage region cold air intake chamber 24, the second-period intermediate storage region cold air pipe 62 extends from the operating room 20 to the ventilation equipment room 54, and second-period intermediate storage region cold air inlets (59, 60) connected with the second-period intermediate storage region cold air pipe 62 are disposed on the wall of the operating room 20. Cold air enters from the second-period intermediate storage region cold air inlets (59, 60), then enters into the second-period intermediate storage region cold air intake chamber 24 through the second-period intermediate storage region cold air pipe 62, then enters into the cold air channel of the silos in the second-period intermediate storage region through the second-period intermediate storage region cold air intake chamber 24, and enters into the ventilation heat shield cylinder 5 from the air inlet of the ventilation heat shield cylinder 5. After entering into the ventilation heat shield cylinder 5, cold air moves up along the length direction of the ventilation heat shield cylinder 5, and finally enters into the second-period intermediate storage region hot air removal chamber 26 through the air outlet of the ventilation heat shield cylinder 5. The second-period intermediate storage region first heat removal pipe 61 is connected to the upper part of the second-period intermediate storage region hot air removal chamber 26, the second-period intermediate storage region heat removal pipe 61 extends from the operating room 20 to the ventilation equipment room 54, and the second-period intermediate storage region heat removal pipe 61 is connected with the second-period intermediate storage region ventilation heat removal vents on the top of the ventilation equipment room 54 through the seventh air valve.

In the residual heat removal ventilation system corresponding to the second-period intermediate storage region, cold air flows into the second-period intermediate storage region cold air intake pipe from the second-period intermediate storage region cold air inlets (59, 60), then flows downwards through the cold air through-hole 11 on the silo mouth floorslab 19, and enters into the second-period intermediate storage region cold air intake chamber 24. In the second-period intermediate storage region cold air intake chamber 24, cold air is distributed to flow into the cold air pipe in each silo, flows downward to the bottom of the silo along the external side of the ventilation heat shield cylinder 5, then flows into the internal side of the ventilation heat shield cylinder 5 from the opening on the bottom of the ventilation heat shield cylinder 5, cools the spent fuel storage canisters placed in the ventilation heat shield cylinder 5, becomes hot air after carrying away residual heat emitted from the spent fuel storage canisters, and flows into the second-period intermediate storage region hot air removal chamber 26 from the top of the ventilation heat shield cylinder 5. After converging with hot air that flows out of other silos, the hot air flows into the second-period intermediate storage region heat removal pipe 61, flows upwards through air pipes in the spent fuel operating room 20 and the spent fuel ventilation equipment room 54, flows upwards to the spent fuel building roof 53, and discharges to the external environment from the second-period intermediate storage region ventilation heat removal vent.

It is preferred that the number of the second-period intermediate storage region ventilation heat removal vents is multiple, preferably two, and distributed symmetrically on the spent fuel building, and thus the residual heat can be discharged effectively in any condition of wind direction. Furthermore, it is preferred that the number of the second-period intermediate storage region cold air inlets (59, 60) is multiple.

In the present embodiment, the buffer storage region is preferably separated from the first-period intermediate storage region by the first partition 21, and the first-period intermediate storage region is preferably separated from the second-period intermediate storage region by the second partition 27. Based on this, the buffer storage region, the first-period intermediate storage region and the second-period intermediate storage region correspond to an independent residual heat removal ventilation sub-system respectively, thereby guaranteeing the independence of the three storage region residual heat removal ventilation sub-systems.

It can be seen from the embodiments above that the present embodiments provides a residual heat removal ventilation system for dry storage of spent fuel of nuclear power plant, such that the buffer storage region realizes three ventilation operation modes of open loop natural ventilation, open loop forced ventilation and close loop forced ventilation, the first-period intermediate storage region realizes two operation modes of open loop natural ventilation and open loop forced ventilation, and the second-period intermediate storage region realizes the operation mode of open loop natural ventilation. Since all of the three storage region residual heat removal ventilation sub-systems can remove residual heat of spent fuel in the mode of open loop natural ventilation, the safety of spent fuel does not rely on power equipment such as pumps or fans, which not only reduces routine maintenance, saves energy, but also has inherent safety characteristics.

Further, the cold air inlets and the ventilation heat removal vents in the buffer storage region, the first-period intermediate storage region and the second-period intermediate storage region are all located above the spent fuel building, with a distance of 16 m from the ground, and thus, flooding accident due to ground water accumulation will not occur, thereby effectively guaranteeing safety and reliability of the ventilation cooling system of spent fuel storage canisters. Moreover, the number of the cold air inlets and the ventilation heat removal vents in each storage region are two respectively, which significantly reduces the impact of the environmental wind field on the ventilation and cooling of each storage region of the spent fuel storeroom, and satisfies redundant design requirements for residual heat removal.

Furthermore, preferably, the buffer storage region cold air pipe 45, the buffer storage region first heat removal pipe 49, the buffer storage region second heat removal pipe 71, the first-period intermediate storage region cold air pipe 57, the first-period intermediate storage region heat removal first pipe, the first-period intermediate storage region heat removal second pipe, the second-period intermediate storage region cold air pipe 62 and the second-period intermediate storage region heat removal pipes are all disposed at the same side.

In the present embodiment, in general, the high temperature spent fuel storage canisters are stored in the buffer storage region, after a while, when their temperature and radiation decrease, they can be transferred to the second-period intermediate storage region, and residual heat of spent fuel is removed by natural ventilation.

It is to be noted that although the buffer storage region, the first-period intermediate storage region and the second-period intermediate storage region of the present embodiments are disposed in the same plant, actually, each storage store can be independently disposed, and the number of silos in each storage region can be adjusted according to work requirements.

Furthermore, the close loop forced ventilation cooling system of the buffer storage region of the present embodiments may effectively slow down corrosion rate of metal equipment such as the high temperature spent fuel storage canisters in the buffer storage region, may improve the safety of the spent fuel storage system particularly in coastal region, and extend service life of the spent fuel storeroom.

The embodiments above are only for explaining the present disclosure, rather than limiting the present disclosure. Although the present disclosure has been described in detail with reference to the embodiments, it should be understood by those of ordinary skilled in the art that the technical solutions of the present disclosure may be variously combined, modified or equivalently replaced, without departing from the spirit and scope of various embodiments of the present disclosure, all of which should be encompassed by the scope of the claims of the present disclosure.

INDUSTRIAL UTILITY

The residual heat removal ventilation system for dry storage of spent fuel of nuclear power plant provided by the present disclosure is mounted in the spent fuel building, does not require first using a pool storage method to store spent fuel, and the safety of the spent fuel does not rely on power equipment such as pump or fans, thus not only reducing routine maintenance, saving energy, but also has inherent safety. Furthermore, the residual heat removal ventilation system for dry storage of spent fuel of nuclear power plant of the present disclosure may be used to cool the spent fuel storage canisters within spent fuel storage facilities of pebble bed high temperature gas-cooled reactor nuclear power plant, and discharge residual heat of the spent fuel storage canisters to the external environment by means of combining forced ventilation and natural ventilation.

What is claimed is:

1. residual heat removal ventilation system for spent fuel dry storage facility of nuclear power plant, characterized in that it is disposed in a spent fuel building, and the spent fuel building comprises a storeroom, an operating room, and a ventilation equipment room sequentially arranged from bottom to top; a ventilation heat shield cylinder is disposed in each silo of the storeroom comprising a buffer storage region, a buffer storage region cold air intake chamber and a buffer storage region hot air removal chamber separated by a buffer storage region cold and hot air chamber separator are disposed at an upper part of the buffer storage region, wherein, the buffer storage region hot air removal chamber is located above the buffer storage region cold air intake chamber;

a buffer storage region cold air pipe is connected to an upper part of the buffer storage region cold air intake chamber, the buffer storage region cold air pipe extends from the operating room to the ventilation equipment room, and a buffer storage region cold air inlet connected with the buffer storage region cold air pipe is disposed on the wall of the operating room, such that cold air enters into the buffer storage region cold air intake chamber from the buffer storage region cold air pipe, enters into a cold air channel of silos of the buffer storage region through the buffer storage region cold air intake chamber, enters into the ventilation heat shield cylinder from an air inlet of the ventilation heat shield cylinder, and enters into the buffer storage region hot air removal chamber through an air outlet of the ventilation heat shield cylinder; a buffer storage region first heat removal pipe is connected to an upper part of the buffer storage region hot air removal chamber, the buffer storage region first heat removal pipe extends from the operating room to the ventilation equipment room, and connect with a buffer storage region ventilation heat removal vent on the top of the ventilation equipment room through a first air valve;

a buffer storage region second heat removal pipe, an air cooling equipment, a buffer storage region heat removal fan and a bypass air pipe are disposed in the ventilation equipment room; the buffer storage region second heat removal pipe, the air cooling equipment, and the bypass air pipe are connected in parallel with the buffer storage region first heat removal pipe respectively; the buffer storage region second heat removal pipe is connected with the buffer storage region ventilation heat removal vent through a second air valve; a third air valve and a fourth air valve are connected to the inlets of the air cooling equipment and the bypass air pipe respectively, the outlets of the air cooling equipment and the bypass air pipe are both connected into an inlet of the buffer storage region heat removal fan, and an outlet of the buffer storage region heat removal fan is connected to the buffer storage region first heat removal pipe and the buffer storage region second heat removal pipe through a fifth air valve and a sixth air valve respectively.

2. The residual heat removal ventilation system for spent fuel dry storage facility of nuclear power plant of claim 1, characterized in that the storeroom further comprises a second-period intermediate storage region isolated from the buffer storage region, a second-period intermediate storage region cold air intake chamber and a second-period intermediate storage region hot air removal chamber, which are separated by a second-period intermediate storage region cold and hot air chamber separator, are disposed at an upper part of the second-period intermediate storage region, and the second-period intermediate storage region hot air removal chamber is located above the second-period intermediate storage region cold air intake chamber;

a second-period intermediate storage region cold air pipe is connected to an upper part of the second-period intermediate storage region cold air intake chamber, the second-period intermediate storage region cold air pipe extends from the operating room to the ventilation equipment room, and a the second-period intermediate storage region cold air inlet connected with the second-period intermediate storage region cold air pipe is disposed on the wall of the operating room, such that cold air enters into the second-period intermediate storage region cold air intake chamber through the second-period intermediate storage region cold air pipe, enters into a cold air channel of silos of the second-period intermediate storage region through the second-period intermediate storage region cold air intake chamber, enters into the ventilation heat shield cylinder from an air inlet of the ventilation heat shield cylinder, and enters into the second-period intermediate storage region hot air removal chamber through an air outlet of the ventilation heat shield cylinder; a second-period intermediate storage region heat removal pipe is connected to an upper part of the second-period intermediate storage region hot air removal chamber, the second-period intermediate storage region heat removal pipe extends from the operating room to the ventilation equipment room, and connect with a second-period intermediate storage region ventilation heat removal vent on the top of the ventilation equipment room through a seventh air valve.

3. The residual heat removal ventilation system for spent fuel dry storage facility of nuclear power plant of claim 2, characterized in that the storeroom further comprises several first-period intermediate storage regions separated from the buffer storage region and the second-period intermediate storage region;

a first-period intermediate storage region cold air intake chamber and a first-period intermediate storage region hot air removal chamber separated by a first-period intermediate storage region cold and hot air chamber separator are disposed at an upper part of the first-period intermediate storage region, and the first-period intermediate storage region hot air removal chamber is located above the first-period intermediate storage region cold air intake chamber; a first-period intermediate storage region cold air pipe is connected to an upper part of the first-period intermediate storage region cold air intake chamber, the first-period intermediate storage region cold air pipe extends from the operating room to the ventilation equipment room, and a first-period intermediate storage region cold air inlet connected with the first-period intermediate storage region cold air pipe is disposed on the wall of the operating room, such that cold air enters into the first-period intermediate storage region cold air intake chamber through the first-period intermediate storage region cold air pipe, enters into a cold air channel of silos of the first-period intermediate storage region through the first-period intermediate storage region cold air intake chamber, enters into the ventilation heat shield cylinder from an air inlet of the ventilation heat shield cylinder, and enters into the first-period intermediate storage region hot air removal chamber through an air outlet of the ventilation heat shield cylinder; a first-period intermediate storage region heat removal first pipe is connected to an upper part of the first-period intermediate storage region hot air removal chamber, the first-period intermediate storage region heat removal first pipe extends from the operating room to the ventilation equipment room, and connect with a first-period intermediate storage region ventilation heat removal vent on the top of the ventilation equipment room through an eighth air valve;

a first-period intermediate storage region heat removal second pipe, a first-period intermediate storage region heat removal fan and a ventilation pipe are disposed in the ventilation equipment room; the first-period intermediate storage region heat removal second pipe and the ventilation pipe are connected in parallel with the buffer storage region first heat removal pipe, respectively; the first-period intermediate storage region heat removal second pipe is connected with the first-period intermediate storage region ventilation heat removal vent through a ninth air valve; the ventilation pipe is connected with the first-period intermediate storage region heat removal fan, and an outlet of the first-period intermediate storage region heat removal fan is connected to the first-period intermediate storage region heat removal first pipe through a tenth air valve and to the first-period intermediate storage region heat removal second pipe through an eleventh air valve.

4. The residual heat removal ventilation system for dry storage of spent fuel of nuclear power plant of claim 3, characterized in that the buffer storage region heat removal fan and the first-period intermediate storage region heat removal fan both comprise two working heat removal fans and one backup heat removal fan.

5. The residual heat removal ventilation system for spent fuel dry storage facility of nuclear power plant of claim 3, characterized in that the buffer storage region is separated from the first-period intermediate storage region by a first partition, and the first-period intermediate storage region is separated from the second-period intermediate storage region by a second partition.

6. The residual heat removal ventilation system for spent fuel dry storage facility of nuclear power plant of claim 3, characterized in that the number of the buffer storage region cold air inlet, the second-period intermediate storage region cold air inlet, the first-period intermediate storage region cold air inlet, the buffer storage region ventilation heat removal vent, the second-period intermediate storage region ventilation heat removal vent and the first-period intermediate storage region ventilation heat removal vent is multiple.

7. The residual heat removal ventilation system for spent fuel dry storage facility of nuclear power plant of claim 3, characterized in that an operating room roof is disposed at the top of the operating room, and a supporting beam is disposed below the operating room roof; the buffer storage region cold air pipe, the buffer storage region first heat removal pipe, the buffer storage region second heat removal pipe, the first-period intermediate storage region cold air pipe, the first-period intermediate storage region heat removal first pipe, the first-period intermediate storage region heat removal second pipe, the second-period intermediate storage region cold air pipe and the second-period intermediate storage region heat removal pipe are all disposed at the same side, wherein, the buffer storage region cold air pipe, the buffer storage region first heat removal pipe, and the buffer storage region second heat removal pipe are disposed in correspondence to the buffer storage region, the first-period intermediate storage region cold air pipe, the first-period intermediate storage region heat removal first pipe, and the first-period intermediate storage region heat removal second pipe are disposed in correspondence to the first-period intermediate storage region, and the second-period intermediate storage region cold air pipe and the second-period intermediate storage region heat removal pipe are disposed in correspondence to the second-period intermediate storage region.

8. The residual heat removal ventilation system for spent fuel dry storage facility of nuclear power plant of claim 1, characterized in that a silo mouth floorslab is disposed at the top of the storeroom, a silo mouth corresponding to each silo is disposed on the silo mouth floorslab, and each of the silo mouth is provided with a silo plug accordingly; a bottom extremity of the ventilation heat shield cylinder is fixed on the floor of the spent fuel building, and a top of the ventilation heat shield cylinder extends to the outlet of the silo under silo mouth floorslab; an air inlet of the ventilation heat shield cylinder is arranged circumferentially along the bottom of the ventilation heat shield cylinder; the silo guide-rails extending from the floor of the spent fuel building to the silo mouth floorslab are fixed with the internal side of the ventilation heat shield cylinder, the silo guide-rails are used for the guidance of the storage canister in the hoisting process, and the silo guide-rails are fixed to the silo outer wall by lateral supporting; and the ventilation heat shield cylinder and the silo guide-rails are both segmented.

9. The residual heat removal ventilation system for spent fuel dry storage facility of nuclear power plant of claim 1, characterized in that multilayer anti-seismic floorslabs are disposed between the silos and the outer wall of the spent fuel building.

10. The residual heat removal ventilation system for spent fuel dry storage facility of nuclear power plant of claim 1, characterized in that a temperature measuring room and a transport room are disposed between the spent fuel storeroom and the spent fuel building outer wall; the temperature measuring room is located under the ground, and the transport room is located above the ground; several through-wall storage canister temperature measuring apparatuses are disposed on internal wall of the temperature measuring room and the transport room.

* * * * *